United States Patent [19]

Stokes

[11] Patent Number: 4,481,439

[45] Date of Patent: Nov. 6, 1984

[54] INVERTED MOLDED COMMUTATORS

[75] Inventor: Vijay K. Stokes, Schenectady, N.Y.

[73] Assignee: General Electric Company, Schenectady, N.Y.

[21] Appl. No.: 454,130

[22] Filed: Dec. 29, 1982

[51] Int. Cl.[3] .......... H02K 13/00

[52] U.S. Cl. .......... 310/233; 310/43; 310/45; 310/67 R; 310/235

[58] Field of Search .......... 310/67 R, 233, 234, 310/235, 236, 227, 219, 229, 230, 231, 238, 43, 45, 248; 200/25; 29/597

[56] References Cited

U.S. PATENT DOCUMENTS

| | | | |
|---|---|---|---|
| 996,895 | 7/1911 | Sutton | 310/227 |
| 1,253,265 | 1/1918 | McKeown | 310/219 |
| 1,631,461 | 6/1927 | Bonsieur | 310/235 |
| 3,182,217 | 5/1965 | Quinn | 310/235 |
| 3,554,868 | 12/1970 | Bates | 310/231 |
| 3,557,325 | 1/1971 | Hansen | 310/230 |
| 3,864,821 | 2/1975 | Ito et al. | 29/597 |
| 3,870,914 | 3/1975 | Walker | 310/231 |
| 3,892,987 | 7/1975 | Noodleman | 310/46 |
| 4,384,386 | 5/1983 | Dorner | 310/67 R |

FOREIGN PATENT DOCUMENTS

| | | | |
|---|---|---|---|
| 2130242 | 12/1972 | Fed. Rep. of Germany | 310/231 |
| 2327793 | 12/1974 | Fed. Rep. of Germany | 310/231 |

*Primary Examiner*—R. M. Skudy
*Attorney, Agent, or Firm*—Robert J. Jarvis; James C. Davis, Jr.; Marvin Snyder

[57] ABSTRACT

A molded commutator is made up of segments arranged in a ring with their brush contact surfaces facing inwardly and forming a cylindrical shape. A matrix of plastic is molded between and around the outside of the segment ring in order to separate the segments electrically and to hold them in the ring configuration. A reinforcing metal casing serves to contain the commutator against breaking up due to centrifugal forces experienced during rotation. An alternate embodiment uses metal bands embedded within the matrix for this purpose.

9 Claims, 4 Drawing Figures

INVERTED MOLDED COMMUTATORS

BACKGROUND AND SUMMARY OF THE INVENTION

This invention concerns itself with electrical commutators and, more particularly, concerns a design in which the commutating surface is arranged around the interior of a commutator.

As is well known to those skilled in this art, it has long been common practice to mold commutators in a cylindrical shape with the contacting surface on the exterior. This arrangement, of course, has proven to be a highly successful one for most applications and will undoubtedly remain as the standard for most applications.

The fabrication of commutators by means of a molding process has provided a relatively efficient and economical way of producing commutators which are highly reliable in use. This is particularly true with small commutators where the centrifugal forces experienced by the conductor segments are not large enough to cause the commutator to break apart during use. As commutator size increases, however, the tendency towards centrifugal disassembly increases, thereby imposing a practical upper limit on the size in which molded commutators may be fabricated.

My invention provides an arrangement of commutator parts in which the above described size limitations can be overcome. Briefly described, my invention employs an inverted commutator design in which the conductor segments are arranged around the interior of the commutator, rather than its exterior. A suitable matrix is molded between and around a plurality of segments arranged in a ring with their inner-facing brush contact surfaces defining an overall cylindrical shape. In one embodiment, the commutator is fitted with an outer casing for reinforcement against centrifugal disassembly during use. In an alternate embodiment, this reinforcement is provided by reinforcement bands embedded within the matrix during the matrix molding process. In this alternate embodiment, a connection ring is also embedded in the matrix as a convenient means for attachment of the commutator to a spider, and ultimately, a shaft.

The method of making a commutator by this invention involves the steps of arranging a plurality of conductor segments in a ring with their inner-facing contact brush surfaces defining a cylindrical shape. Then a matrix is molded around and between the segments. In my preferred method, this molding step is carried out within an outer reinforcement casing. In an alternate method, reinforcement bands are molded into the matrix so that they become embedded therein outside the ring of the conductor segments.

It is therefore an object of this invention to provide an inverted commutator in which the contact surfaces of the conductor segments are arranged around the inside of the commutator.

It is also an object of this invention to provide a commutator of the type described which can be economically produced with existing technology.

It is a further object of this invention to provide a commutator of the type described having sufficient strength for use in applications requiring extremely large diameters.

These and other objects of the invention will be more completely understood by reference to the accompaying drawings and the description which follows.

DETAILED DESCRIPTION OF THE INVENTION

Figure 1:
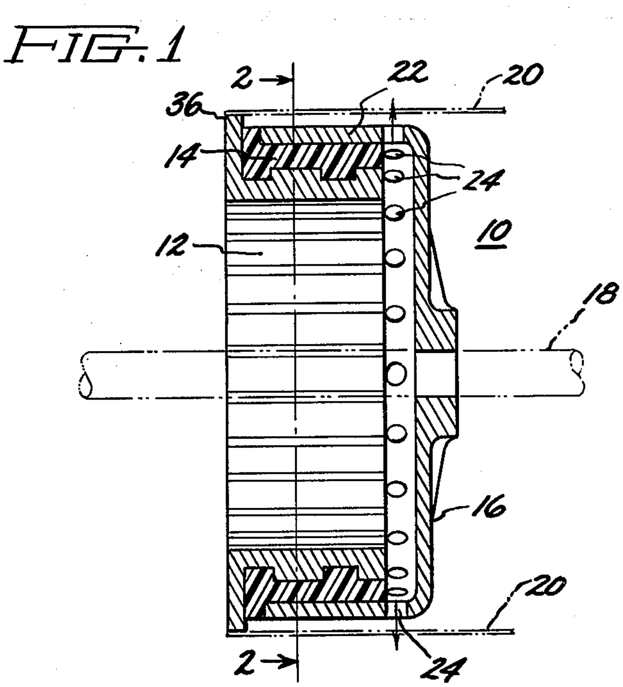
FIG. 1 is a longitudinal section view of a commutator made in accordance with the preferred form of this invention.
Figure 2:
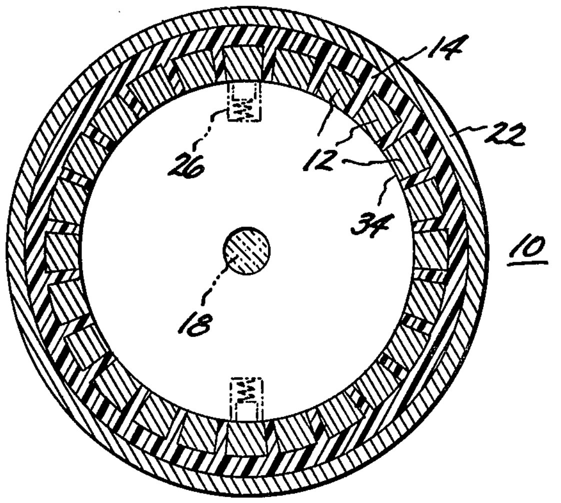
FIG. 2 is a cross sectional view of the commutator shown in FIG. 1 taken on line 2—2.

Referring now to FIGS. 1 and 2, an inverted commutator 10 is shown having a plurality of contact segments 12. Each segment has an inward-facing brush contact surface 34 and the segments 12 are arranged in a ring about a central longitudinal axis so that the brush contact surfaces 34 define a cylinder. In its operating environment, commutator 10 is mounted on a shaft 18, as shown in phantom, and is associated with a pair of stationary contact brush assemblies 26, also shown in phantom in FIG. 2. An insulating matrix 14 surrounds the ring of segments 12 and fills the gaps between the segments. This plastic matrix, which may typically be comprised of phenolic, serves not only to electrically isolate the segments from one another, but also to hold them in the ring configuration shown. The matrix and segments are encased within an outer casing 22 which may be made of steel or any other suitable high tensile strength material for strengthening the commutator. The purpose of outer casing 22 is to hold the matrix 14 and the segments 12 in place during rotation of the commutator, thereby preventing the commutator from breaking apart due to centrifugal forces. Casing 22, as shown in FIG. 1, is formed integrally with a metallic spider 16 which is used to mount the commutator to a shaft 18. Spider 16 is preferably formed with a plurality of vent holes 24 so that during rotation the air at the interior of the commutator is pumped through holes 24 by the centrifugal forces. The commutator segments are cooled by the air that is pulled in axially.

The segments 12 may be made of copper or any other suitable conductor and may be formed with a riser 36, as shown in FIG. 1. These risers 36 provide a convenient way to connect segments 12 with the windings of an armature via suitable conductors 20.

Figure 3:
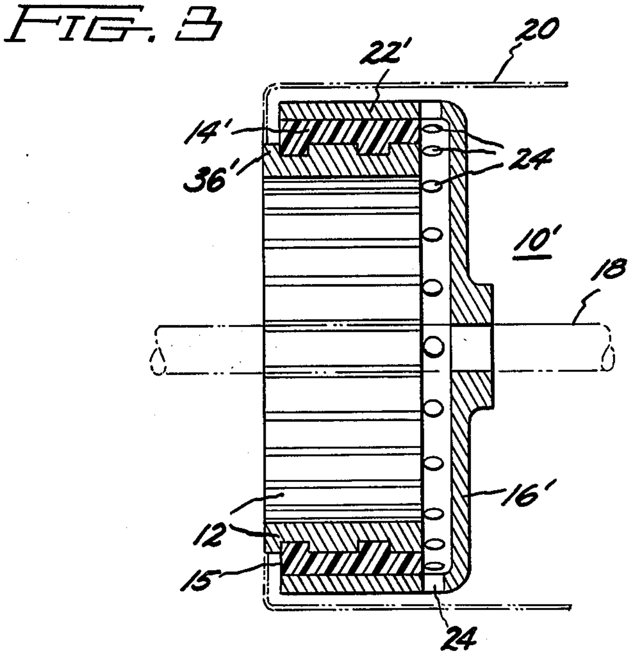
FIG. 3 is a longitudinal section view of an alternative embodiment of the invention.

FIG. 3 shows an alternative embodiment in which the outer casing 22' is co-terminus with the end face 15 of matrix 14'. Copper segments 12' extend somewhat beyond end face 15 so as to provide a riser 36' for attachment of conductors 20.

Figure 4:
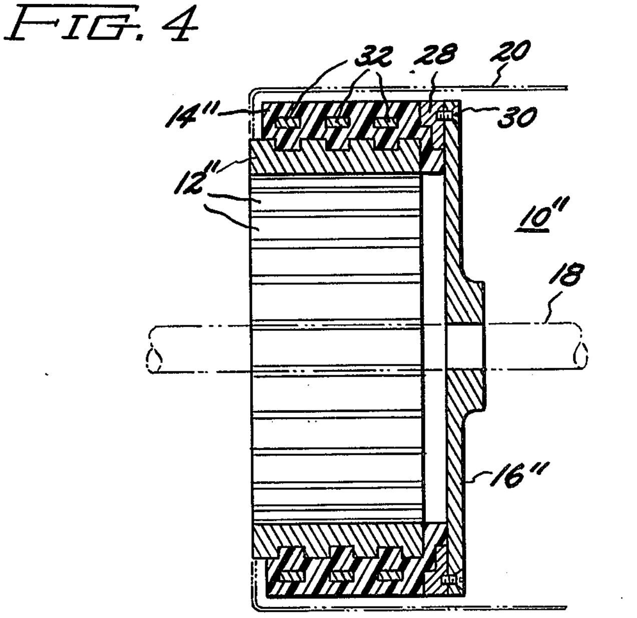
FIG. 4 is a longitudinal section view of another alternative embodiments of the invention.

FIG. 4 shows another alternative embodiment in which reinforcing bands 32 are embedded in matrix 14". These bands 32, which may be comprised of steel, are used instead of an outer casing and serve to provide the necessary strength and resistance to centrifugal disassembly during use. As also shown in FIG. 4, matrix 14" may be formed with an attachment ring 28 molded thereto. Ring 28, typically comprised of steel, serves as a means for mounting commutator 10" to a spider 16" as, for example, by means of countersunk connection screws 30.

In practicing the method of this invention, a ring of segments 12 is first formed with their inner facing brush contact surfaces 34 arranged around a central axis. Each segment is spaced apart and the overall inner configuration is that of a cylinder. Next, casing 22 is placed concentrically around segments 12. A suitable matrix 14 of insulating material, such as phenolic, is molded in an annular cavity formed between inner surface of casing 22' and the outer surfaces of segments 12. For some applications, it may be desirable as a preliminary step to first install a high dielectric strength paste between the segments 12 to insure their electrical isolation from each other in the finished commutator.

The above procedure is, of course, modified in making the embodiment shown in FIG. 4. In that process, reinforcing bands 32 are placed around the segments and ring 28 is positioned concentric with the segments 12'' and axially displaced from the lateral surface of the segment ring. Plastic matrix 14'' is then molded so that bands 32, segments 12'' and ring 28 are embedded within the matrix.

The foregoing describes an inverted commutator in which the contact surfaces of the conductor segments are arranged around the inside of the commutator. The inverted commutator described has sufficient strength for use in applications requiring extremely large diameters, while also being economically manufacturable with existing technology.

While the invention has been particularly shown and described with reference to a preferred embodiment and alternative embodiments thereof, it will be understood by those skilled in the art that various changes in form and details may be made without deparating from the spirit and scope of the invention.

What is claimed is:

1. An inverted commutator assembly for mounting on a rotor shaft in rotating electrical machinery of the type having stationary commutator brushes in wiping engagement with rotatable commutator segments, comprising:

a plurality of said rotatable commutator segments, each segment having a brush contact surface, said segments being circumferentially arranged in a spaced-apart relationship to one another in a ring about a longitudinal axis of rotation so that their brush contact surfaces face inwardly and define a cylindrical surface inside the ring;

a matrix of insulating material molded around the outside of the ring of segments and between the segments for electrically isolating the segments from one another and holding them in the ring configuration; and means for affixing said plurality of commutator segments and said matrix to a rotatable shaft passing through said longitudinal axis of rotation.

2. The invention of claim 1 further comprising reinforcing means arranged about said longitudinal axis for reinforcing the matrix and segments against centrifugal disassembly upon rotation of the commutator about said longitudinal axis.

3. The invention of claim 2 wherein the reinforcing means comprises an outer casing of high tensile strength material surrounding the matrix.

4. The invention of claim 2 wherein the reinforcing means comprises at least one band of high tensile strength material and an attachment ring molded with the matrix outside of the ring of segments.

5. The invention of claim 3 wherein said affixing means comprises spider means affixed to said reinforcing means for mounting the commutator assembly on said shaft.

6. The invention of claim 4 wherein said affixing means comprises spider means affixed to said reinforcing means for mounting the commutator assembly on said shaft.

7. The invention of claim 5 wherein each of said segments includes a riser for attachment to an electrically conductive wire.

8. An inverted commutator assembly for mounting on a rotor shaft in rotating electrical machinery of the type having stationary commutator brushes in wiping engagement with rotatable commutator segments, comprising:

a plurality of said rotatable commutator segments, each segment having a brush contact surface, said segments being circumferentially arranged in a spaced-apart relationship to one another in a ring about a longitudinal axis of rotation so that their brush contact surfaces face inwardly and define a cylindrical surface inside the ring;

a casing positioned concentrically about said segments, said casing and said segment ring forming an annular cavity therebetween;

a matrix of insulating material molded in said annular cavity for electrically isolating the segments from one another and holding them in a ring configuration; and means for affixing said plurality of commutator segments, said casing, and said matrix to a rotatable shaft passing through said longitudinal axis of rotation.

9. The invention of claim 8 wherein said affixing means comprises spider means attached to said casing for mounting the commutator assembly on said shaft.

* * * * *